United States Patent
Wu

(10) Patent No.: US 9,167,424 B2
(45) Date of Patent: Oct. 20, 2015

(54) METHOD OF HANDLING SECURITY IN SRVCC HANDOVER AND RELATED COMMUNICATION DEVICE

(75) Inventor: Chih-Hsiang Wu, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 846 days.

(21) Appl. No.: 13/007,672

(22) Filed: Jan. 17, 2011

(65) Prior Publication Data

US 2011/0176680 A1    Jul. 21, 2011

Related U.S. Application Data

(60) Provisional application No. 61/295,769, filed on Jan. 18, 2010.

(51) Int. Cl.
*H04W 12/04* (2009.01)
*H04L 29/06* (2006.01)
(Continued)

(52) U.S. Cl.
CPC .......... *H04W 12/04* (2013.01); *H04W 36/0038* (2013.01); *H04L 63/06* (2013.01); *H04W 36/0022* (2013.01); *H04W 36/14* (2013.01)

(58) Field of Classification Search
CPC .. H04L 63/06; H04W 36/00; H04W 36/0038; H04W 36/022; H04W 36/14; H04W 12/04
USPC ................... 380/277, 272; 455/436
See application file for complete search history.

(56) References Cited

U.S. PATENT DOCUMENTS

| | | | |
|---|---|---|---|
| 8,249,019 B2* | 8/2012 | Mahdi | 370/331 |
| 8,433,282 B2* | 4/2013 | You et al. | 455/404.1 |
| 2010/0014672 A1* | 1/2010 | Vialen et al. | 380/270 |

(Continued)

FOREIGN PATENT DOCUMENTS

| | | |
|---|---|---|
| EP | 1983796 A1 | 10/2008 |
| WO | 0076194 A1 | 12/2000 |
| WO | 2008023162 A2 | 2/2008 |

OTHER PUBLICATIONS

3GPP TS 36.331 V9.0.0 (Sep. 2009) Technical Specification 3rd Generation Partnership Project; Technical Specification Group Radio Access Network; Evolved Universal Terrestrial Radio Access (E-UTRA) Radio Resource Control (RRC); Protocol specification (Release 9).

(Continued)

*Primary Examiner* — Jung Kim
*Assistant Examiner* — Ngoc D Nguyen
(74) *Attorney, Agent, or Firm* — Winston Hsu; Scott Margo

(57) ABSTRACT

A method for handling security in an SRVCC handover for a mobile device in a wireless communication device is disclosed. The method includes having an active Circuit-Switched (CS) service or a Radio Resource Control (RRC) connection in a CS domain when the mobile device is served by a first network, wherein the first network supports the CS domain and a Packet-Switched (PS) domain; receiving a handover command to handover from the first network to a second network, wherein the second network supports the PS domain; deriving a plurality of security keys used in the second network from a plurality of CS domain keys used in the first network; and applying the plurality of security keys for transmission and reception in the second network.

10 Claims, 5 Drawing Sheets

(51) Int. Cl.
*H04W 36/00* (2009.01)
*H04W 36/14* (2009.01)

(56) References Cited

U.S. PATENT DOCUMENTS

| | | | |
|---|---|---|---|
| 2010/0130207 A1* | 5/2010 | Wu | 455/436 |
| 2010/0135246 A1* | 6/2010 | Hallental | 370/331 |
| 2010/0166184 A1* | 7/2010 | Wu | 380/270 |
| 2010/0220862 A1* | 9/2010 | Geary et al. | 380/272 |
| 2011/0058520 A1* | 3/2011 | Keller et al. | 370/328 |
| 2011/0111731 A1* | 5/2011 | Iwamura et al. | 455/410 |
| 2011/0158121 A1* | 6/2011 | Casati et al. | 370/252 |
| 2011/0159873 A1* | 6/2011 | Iwamura et al. | 455/436 |
| 2012/0163601 A1* | 6/2012 | Veron et al. | 380/270 |
| 2012/0224564 A1* | 9/2012 | Paisal et al. | 370/331 |

OTHER PUBLICATIONS

3GPP TS 23.221 V9.2.0 (Dec. 2009) Technical Specification 3rd Generation Partnership Project; Technical Specification Group Services and System Aspects; Architectural requirements (Release 9).
European patent application No. 11000365.4, European Search Report mailing date: May 10, 2011.

* cited by examiner

METHOD OF HANDLING SECURITY IN SRVCC HANDOVER AND RELATED COMMUNICATION DEVICE

CROSS REFERENCE TO RELATED APPLICATIONS

This application claims the benefit of U.S. Provisional Application No. 61/295,769, filed on Jan. 18, 2010 and entitled "Method and Apparatus for handling security in SRVCC handover in wireless communications system", the contents of which are incorporated herein.

BACKGROUND OF THE INVENTION

1. Field of the Invention

The application relates to a method used in a wireless communication system and related communication device, and more particularly, to a method for handling security in an SRVCC handover in a wireless communication system and related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as to user equipments (UEs).

A Single Radio Voice Call Continuity (SRVCC) provides the ability to transmit a voice call from the VoIP/IMS (IP Multimedia Subsystem) packet domain to the legacy circuit domain. Variations of SRVCC are being standardized to support both GSM/UMTS and CDMA 1x circuit domains. For an operator with a legacy cellular network who wishes to deploy IMS/VoIP-based voice services in conjunction with the rollout of an LTE network, SRVCC provides their VoIP subscribers with coverage over a much larger area than would typically be available during the rollout of a new network.

SRVCC functions as follows. An SRVCC-capable UE engaged in a voice call transmits measurement reports including measurement results to the LTE network (e.g. E-UTRAN). The LTE network determines that the voice call needs to be moved to the legacy Circuit-Switched (CS) domain based on the measurement results. It notifies a mobile switching center (MSC) server of the need to switch the voice call from the Packet-Switched (PS) to the CS domain and initiates a handover of the LTE voice bearer to the circuit network (e.g. UTRAN, GERAN or CDMA2000). The MSC server establishes a bearer path for the mobile station in the legacy network and notifies the IMS core that the UE's call leg is moving from the PS to the CS domain. The call leg represents a logical connection between the router and either a telephony endpoint over a bearer channel, or another endpoint. The circuit-packet function in the IMS core then performs the necessary inter-working functions. When the UE arrives on-channel in the legacy network, it switches its internal voice processing from VoIP to legacy-circuit voice, and the call continues.

Information security shall be applied for transmissions during and after the SRVCC to avoid malicious intruders. In the LTE, UMTS, and GERAN Iu mode systems, ciphering and integrity protection are employed, whereas the GERAN (non Iu mode) only applies ciphering. Furthermore, the LTE is a pure packet switched (PS) system, while the UMTS, GERAN and GERAN Iu mode systems are hybrid systems of PS and CS (Circuit Switched) service domains. Thus, a UE compatible with all the abovementioned systems includes: security configuration of the LTE system (for E-UTRAN) including a START, a CK (Cipher Key), an IK (Integrity Key), an eKSI (evolved Key Set Identifier), a NAS DL COUNT (Non Access Stratum Downlink COUNT), and a $K_{ASME}$ (a key used between the UE and a mobile management entity); security configuration of the UMTS (for UTRAN) and GERAN Iu mode systems including $START_{CS}/START_{PS}$, $CK_{CS}/CK_{PS}$, $IK_{CS}/IK_{PS}$, $KSI_{CS}/KSI_{PS}$, and $COUNT_{PS}$; and security configuration of the GERAN system including a GSM ciphering key (CK) and a GPRS (Global Packet Radio Service) ciphering key (CK).

The handling of security keys (e.g. ciphering and integrity) for SRVCC handover from E-UTRAN to UTRAN/GERAN/CDMA2000 is specified in 3GPP TS 23.216. However, the handling of security keys for SRVCC from UTRAN/GEARN/CDMA2000 to E-UTRAN has not been defined. In UTRAN, the UE may have two active key sets (One key set is for CS and the other key set is for PS). It is not clear what key set is used to derive security keys used in E-UTRAN. Therefore the call drops after the SRVCC handover from UTRAN/GEARN/CDMA2000 to E-UTRAN because the UE and the network may not use same security keys talking to each other.

SUMMARY OF THE INVENTION

A method of handling security in an SRVCC handover for a mobile device in a wireless communication system and a related communication device are provided.

A method for handling security in an SRVCC handover for a mobile device in a wireless communication device is disclosed. The method comprises having an active Circuit-Switched (CS) service or a Radio Resource Control (RRC) connection in a CS domain when the mobile device is served by a first network, wherein the first network supports the CS domain and a Packet-Switched (PS) domain; receiving a handover command to handover from the first network to a second network, wherein the second network supports the PS domain; deriving a plurality of security keys used in the second network from a plurality of CS domain keys used in the first network; and applying the plurality of security keys for transmission and reception in the second network.

A method for handling security in an SRVCC handover for a mobile device in a wireless communication device is disclosed. The method comprises having an active Circuit-Switched (CS) service or a first Radio Resource Control (RRC) connection in a CS domain and an active Packet-Switched (PS) service or a second RRC connection in a PS domain when the mobile device is served by a first network, wherein the first network supports the CS domain and the PS domain; receiving a handover command to handover from the first network to a second network, wherein the second network supports the PS domain; deriving a plurality of security keys used in the second network from a plurality of PS domain keys used in the first network; and applying the plurality of security keys for transmission and reception in the second network.

A communication device for handling security in an SRVCC handover in a wireless communication device is disclosed. The communication device comprises means for having an active Circuit-Switched (CS) service or a Radio Resource Control (RRC) connection in a CS domain when the mobile device is served by a first network, wherein the first network supports the CS domain and a Packet-Switched (PS) domain; means for receiving a handover command to handover from the first network to a second network, wherein the second network supports the PS domain; means for deriving a plurality of security keys used in the second network from a plurality of CS domain keys used in the first network; and means for applying the plurality of security keys for transmission and reception in the second network.

A communication device for handling security in an SRVCC handover in a wireless communication device is disclosed. The communication device comprises means for having an active Circuit-Switched (CS) service or a first Radio Resource Control (RRC) connection in a CS domain and an active Packet-Switched (PS) service or a second RRC connection in a PS domain when the mobile device is served by a first network, wherein the first network supports the CS domain and the PS domain; means for receiving a handover command to handover from the first network to a second network, wherein the second network supports the PS domain; means for deriving a plurality of security keys used in the second network from a plurality of PS domain keys used in the first network; and means for applying the plurality of security keys for transmission and reception in the second network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
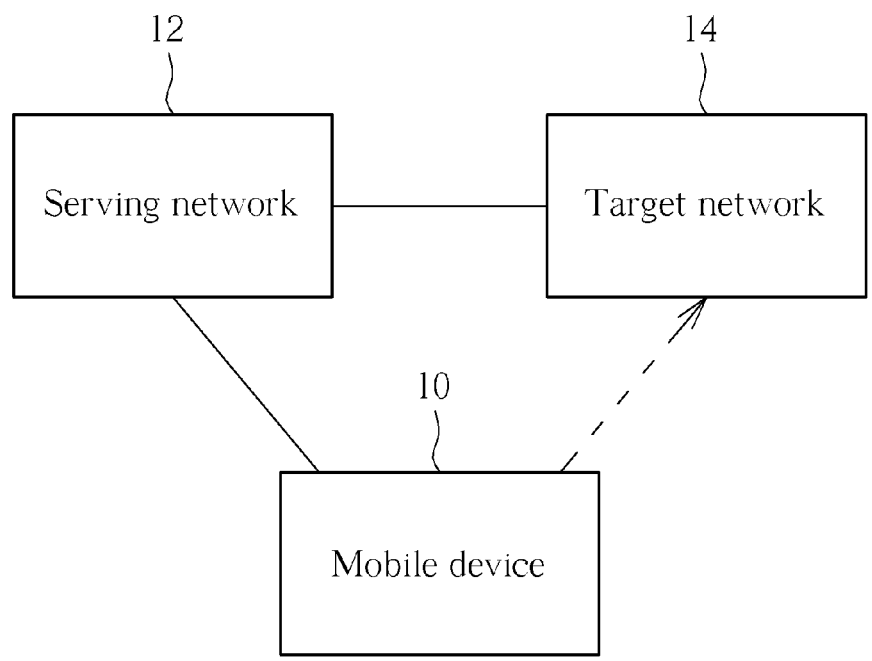
FIG. 1 is a schematic diagram of an exemplary wireless communication system.

Please refer to FIG. 1, which simply illustrates an exemplary wireless communication system 10. In FIG. 1, a serving network 12 and a target network 14 employ different radio access technologies (RATs), and the mobile device 10 supporting both of the RATs is served by the serving network 12. The serving network 12 supports multiple service domains and may be a network of a UMTS (Universal Mobile Telecommunications System) system, a GSM system, a GERAN Iu mode system or a CDMA (Code division multiple access) 2000 system supporting both PS (Packet Switched) and CS (Circuit Switched) service domains. The target network 14 may be a LTE (long-term evolution) or a HSPA+ (High Speed Packet Access Plus) system network only supporting a PS (Packet Switched) service domain. In the UMTS system, the network is referred as a Universal Terrestrial Radio Access Network (UTRAN) comprising a radio network controller (RNC) and a plurality of NBs (Node Bs); In the GSM/GERAN Iu mode system, the network is referred as a GERAN comprising a base station controller (BSC) and a plurality of base stations; In the LTE system, the network is referred as a evolved-UTRAN (EUTRAN) comprising a plurality of eNBs (evolved-Node Bs). The mobile device 10 is referred as a user equipment (UEs) or a mobile station (MS) supporting the abovementioned RATs and may be a device such as a mobile phone, a computer system, etc. Besides, the network and the mobile device 10 can be seen as a transmitter or receiver according to transmission direction, e.g., for uplink (UL), the mobile device 10 is the transmitter and the network is the receiver, and for downlink (DL), the network is the transmitter and the mobile device 10 is the receiver. When the mobile device 10 performs a Single Radio Voice Call Continuity (SRVCC) handover from the serving network 12 to the target network 14, the serving network 12 transfers necessary configuration (capability, mobility, security configuration, etc.) of the target network 14 to the mobile device 10 so that the mobile device 10 changes its configuration based on the transferred configuration and establishes a connection to the target network 14. When the connection establishment is successful, the mobile device 10 disconnects with the serving network 12.

Figure 2:
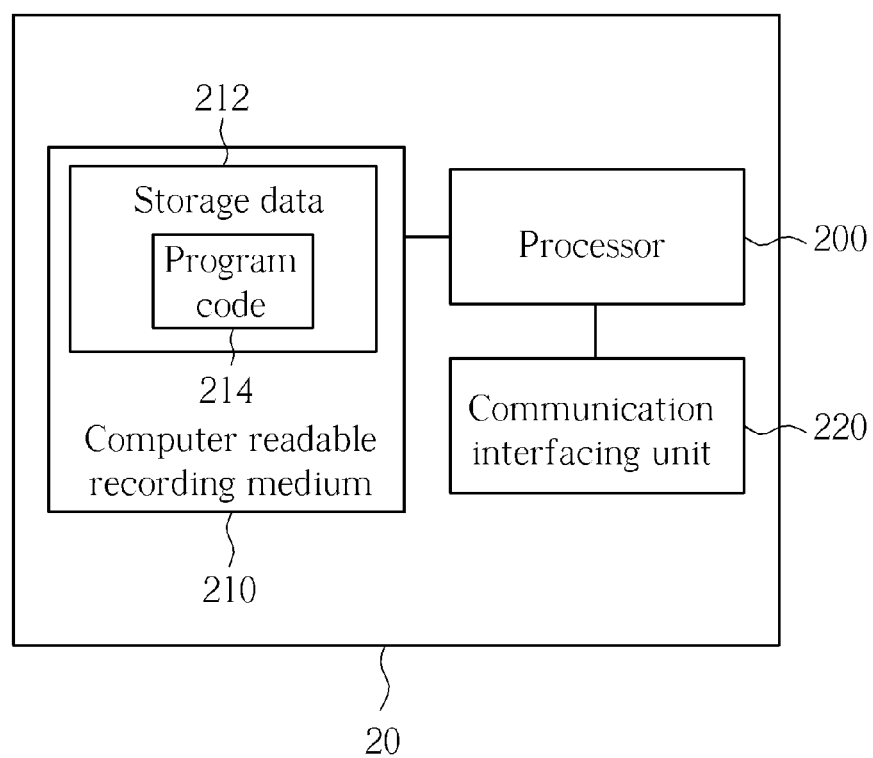
FIG. 2 is a schematic diagram of an exemplary communication device.

Please refer to FIG. 2, which is a schematic diagram of an exemplary communication device 20. The communication device 20 can be the mobile device or the network shown in FIG. 1 and includes a processor 200, a computer readable recording medium 210 and a communication interfacing unit 220. The computer readable recording medium 210 may be any data storage device that stores storage data 212, including program code 214, thereafter read and processed by the processor 200. Examples of the computer readable recording medium 210 includes a subscriber identity module (SIM), read-only memory (ROM), random-access memory (RAM), CD-ROMs, magnetic tapes, hard disks, optical data storage devices, and carrier waves (such as data transmission through the Internet). The communication interfacing unit 220 is preferably a radio transceiver for wirelessly communicating with other communication devices and can transform process results from the processor 200 into radio signals.

Preferably, the communication device 20 supports the LTE or HSPA+, and UMTS, GSM or GERAN Iu mode systems. For security operation, the communication device 20 stores security configuration of the LTE system (for EUTRAN) including a START, a CK (Cipher Key), an IK (Integrity Key), an eKSI (evolved Key Set Identifier), a NAS DL COUNT (Non Access Stratum Downlink COUNT), and a $K_{ASME}$ (a mobile-management-level key used between the UE and a MME (mobile management entity); security configuration of the UMTS (for UTRAN) or GERAN Iu mode systems including $START_{CS}/START_{PS}$, $CK_{CS}/CK_{PS}$, $IK_{CS}/IK_{PS}$, $KSI_{CS}/KSI_{PS}$, and $COUNT_{CS}/COUNT_{PS}$; or security configuration of the GERAN system including a GSM ciphering key (CK) for the CS domain and a GPRS (Global Packet Radio Service) ciphering key (CK) for the PS domain.

Figure 3:
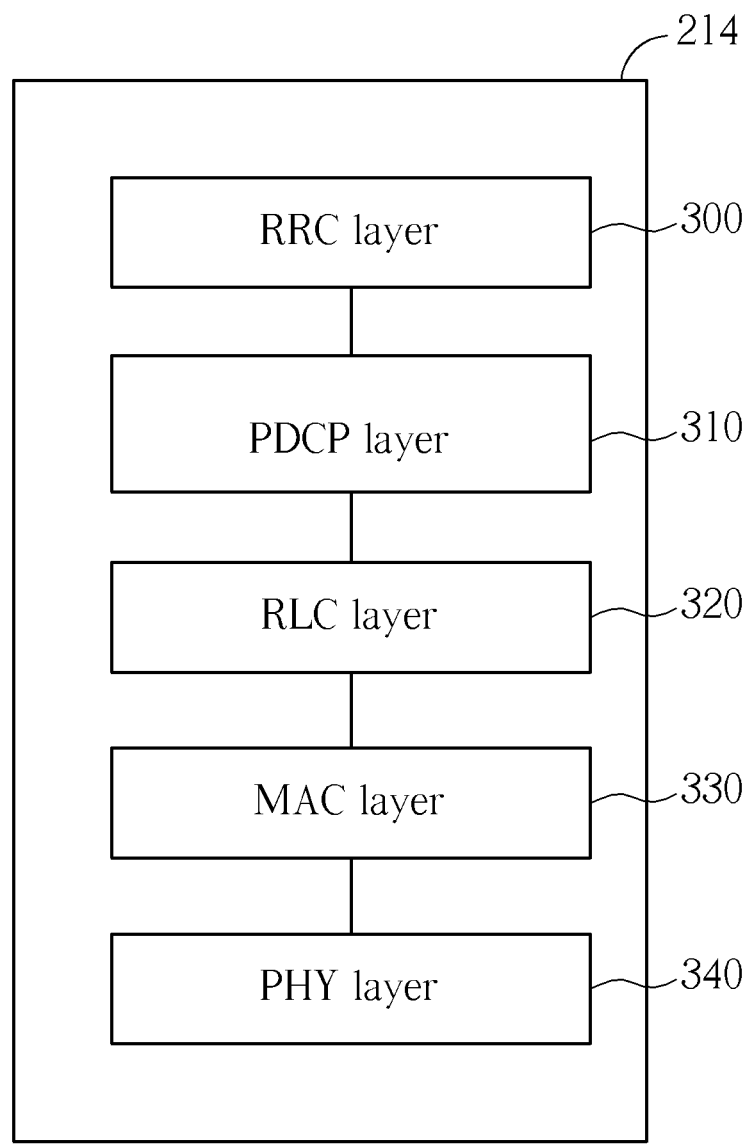
FIG. 3 illustrates the program code in FIG. 2
Figure 4:
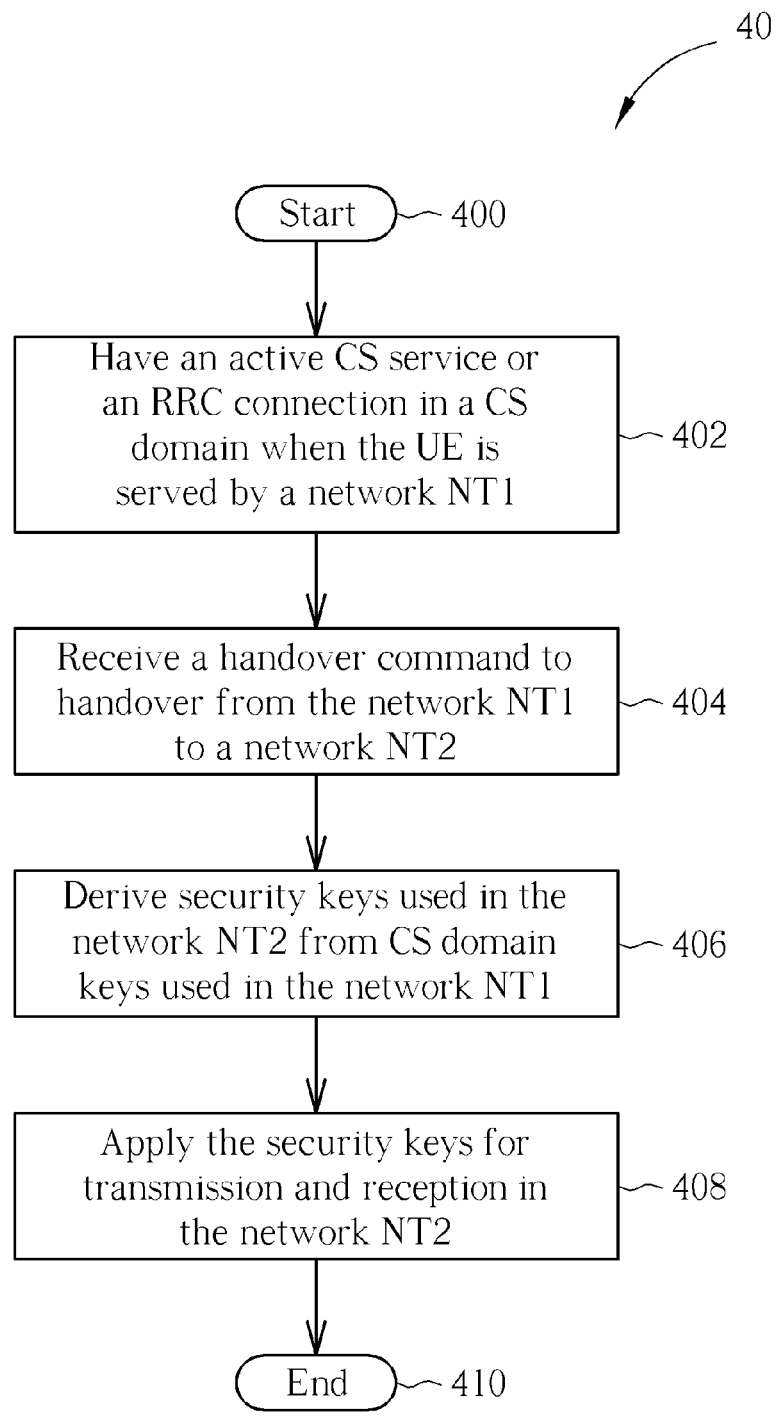
FIG. 4 is a flow chart of an exemplary process.

Please refer to FIG. 3, which illustrates the program code 214 in FIG. 2. The program code 214 includes program code of multiple communications protocol layers, which from top to bottom are a radio resource control (RRC) layer 300, a packet data convergence protocol (PDCP) layer 310, a radio link control (RLC) layer 320, a medium access control (MAC) layer 330 and a physical (PHY) layer 340.

Please refer to FIG. 3, which is a flow chart of an exemplary process 40. The process 40 is used for security in a SRVCC handover for a UE in a wireless communication system. The wireless communication system could be the wireless communication system 10. The process 40 can be compiled into the program code 214 and include the following steps:

Step 400: Start.
Step 402: Have an active CS service or an RRC connection in a CS domain when the UE is served by a network NT1.
Step 404: Receive a handover command to handover from the network NT1 to a network NT2.
Step 406: Derive security keys used in the network NT2 from CS domain keys used in the network NT1.
Step 408: Apply the security keys for transmission and reception in the network NT2.
Step 410: End.

According to the process 40, when the UE is served by the network NT1 the UE may have the active CS service or the RRC connection in the CS domain. The network NT1 may be referred as to the serving network 12 (e.g. UTRAN/UMTS, GERAN/UMTS or CDMA2000), which support both the CS domain and the PS domain. In the meanwhile, the UE receives the handover command to handover from the network NT1 to the network NT2. The network NT2 may be referred as to the target network 14 (e.g. E-UTRAN or related EPS (Evolved packet system)), which merely support the PS domain. The UE may derive the security keys (e.g. a START, a CK, an IK, an eKSI, a NAS DL COUNT, and a $K_{ASME}$) used in the network NT2 from the CS domain keys (e.g. $START_{CS}$, $CK_{CS}$, $IK_{CS}$, $KSI_{CS}$, and $COUNT_{CS}$) used in the network NT1 and applies the security keys for transmission and reception in the network NT2. Consequently, the UE can handle the security in SRVCC handover from the network NT1 (e.g. UTRAN/UMTS, GERAN/UMTS or CDMA2000) to the network NT2 (e.g. E-UTRAN).

Preferably, the CS domain keys could be most recently generated by a successful UMTS AKA (Authentication and Key Agreement) run or a UMTS security context. According to the 3rd Generation Partnership Project (3GPP), AKA is provided for use between the UE and the core network (CN). With AKA, the UE and the CN can authenticate each other and ensure data security and ciphering. A new key set will be allocated to the UE after AKA is run. The CS domain keys most recently generated by the UMTS AKA run may or may not have been taken into use by the UE or MSC (Mobile Switching Center). The MSC is the primary service delivery node for GSM/CDMA, responsible for the services such as voice calls, short message service (SMS), conference calls, FAX and circuit switched data). The MSC also sets up and releases the end-to-end connection, handles mobility and hand-over requirements during the call. The UMTS security context is established between the UE and the network NT1 domain as a result of the execution of UMTS AKA or as a result of inter RAT mobility from E-UTRAN to UTRAN or GERAN. The UMTS security context could be created from an EPS security context during a previous handover of the UE to the network NT1 (e.g. UTRAN) from the network NT2 (e.g. E-UTRAN). There may be old CS domain keys having existed in the UE since the previous visit of the UMTS before the handover. In this situation, the UE does not use the old CS domain keys. Instead, the UE creates the UMTS security context from the EPS security context.

After the security keys are derived, the UE sets the eKSI to an initial value or to the KSI. The initial value may be an arbitrary number between 0 and 7. The KSI may be referred as to the key set identifier $KSI_{CS}$, which is associated with the CS domain keys used in the network NT1. In order to match the security keys which the UE derives from, the network NT2 may use the same security keys for security of data transfer. So the network NT1 may send the CS domain keys to the network NT2, the network NT2 derives the security keys from the CS domain keys used in the network NT1. To be more specific, a MSC or a SGSN (Serving GPRS Support Node) of the network NT1 (e.g. UTRAN/GREAN/CDMA2000) send the CS domain keys (e.g. $CK_{CS}$ and $IK_{CS}$) used in the network NT1. Then, a MME of the LTE system derives the security keys from the CS domain keys (e.g. $CK_{CS}$ and $IK_{CS}$). The SGSN is a main component of the GPRS network, which handles all packet switched data within the network, e.g. the mobility management and authentication of the users. The SGSN performs the same functions as the MSC for voice traffic. In addition, the network NT1 may send the KSI to the network NT2. Accordingly, the network NT2 may set the eKSI to the initial value or to the KSI. As mentioned above, the initial value may be an arbitrary number between 0 and 7 and the KSI may be referred as to the key set identifier $KSI_{CS}$, which is associated with the CS domain keys used in the network NT1.

On the other hand, the network NT1 may derive the security keys from the CS domain keys (e.g. $CK_{CS}$ and $IK_{CS}$) and then send the security keys to the network NT2. Briefly, the network NT2 may derive the security keys itself or get them from the network NT1.

Figure 5:
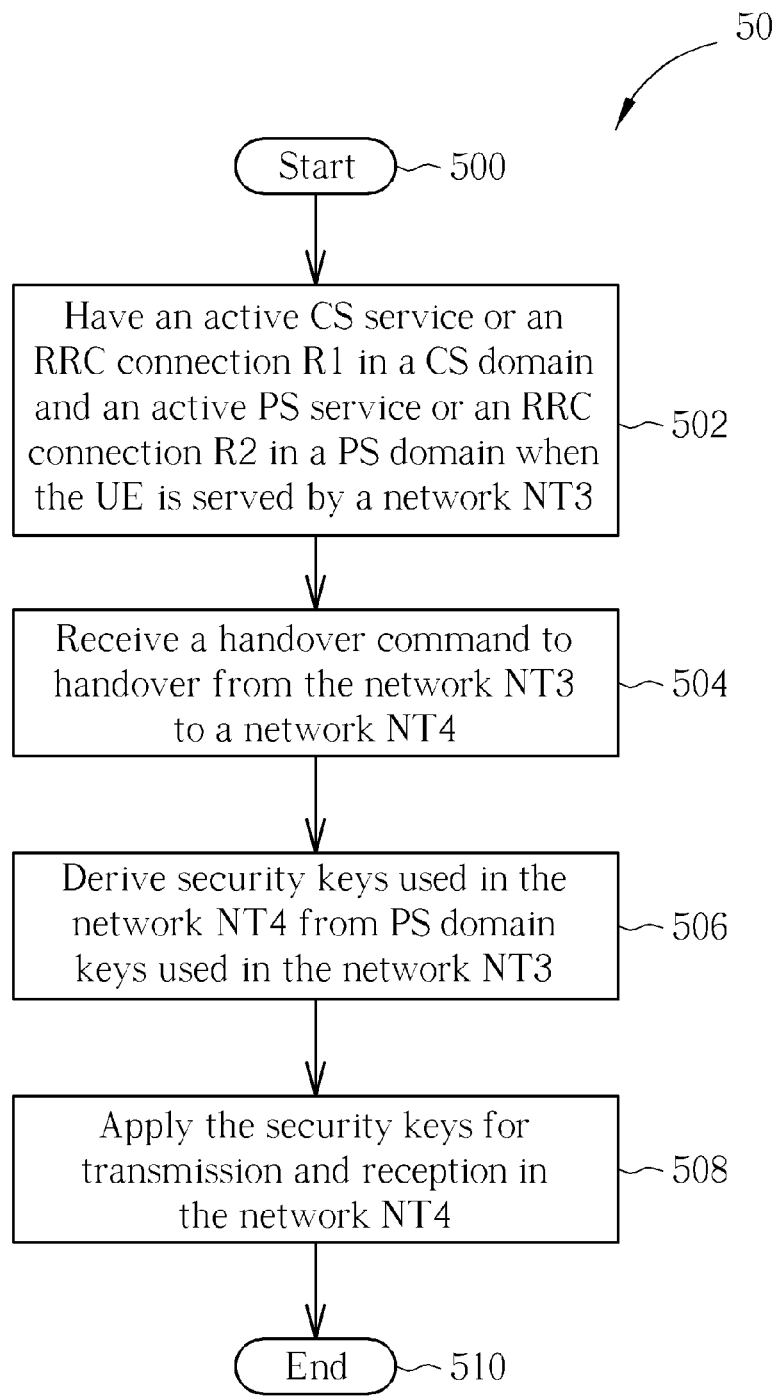
FIG. 5 is a flow chart of an exemplary process.

Please refer to FIG. 5, which is a flow chart of an exemplary process 50. The process 50 is used for security in a SRVCC handover for a UE in a wireless communication system. The wireless communication system could be the wireless communication system 10. The process 50 can be compiled into the program code 214 and include the following steps:

Step 500: Start.

Step 502: Have an active CS service or an RRC connection R1 in a CS domain and an active PS service or an RRC connection R2 in a PS domain when the UE is served by a network NT3.

Step 504: Receive a handover command to handover from the network NT3 to a network NT4.

Step 506: Derive security keys used in the network NT4 from PS domain keys used in the network NT3.

Step 508: Apply the security keys for transmission and reception in the network NT4.

Step 510: End.

According to the process 50, when the UE is served by the network NT3 the UE may have the active CS service or the RRC connection R1 in the CS domain as well as the active PS service or the RRC connection R2 in the PS domain. The network NT3 may be referred as to the serving network 12 (e.g. UTRAN/UMTS, GERAN/UMTS or CDMA2000), which support both the CS domain and the PS domain. In the meanwhile, the UE receives the handover command to handover from the network NT3 to the network NT4. The network NT4 may be referred as to the target network 14 (e.g. E-UTRAN or related EPS, which merely support the PS domain. The UE may derive the security keys (e.g. a START, a CK, an IK, an eKSI, a NAS DL COUNT, and a $K_{ASME}$) used in the network NT4 from the PS domain keys (e.g. $START_{PS}$, $CK_{PS}$, $IK_{PS}$, $KSI_{PS}$, and $COUNT_{PS}$) used in the network NT3 and applies the security keys for transmission and reception in the network NT4. In other words, the network NT3 may have the CS services and the PS services simultaneously. For example, the UE served by the network NT3 may have voice call service in the CS domain and data transfer in the PS domain at the same time. So there would be the CS domain keys and the PS domain keys used in the network NT3. In this situation, the UE derives the security keys used in the network NT4 from the PS domain keys. Consequently, it is clear how the UE handles the security in SRVCC handover from the network NT3 (e.g. UTRAN/UMTS, GERAN/UMTS or CDMA2000) to the network NT4 (e.g. E-UTRAN) when the network NT3 have the CS services and the PS services both.

Preferably, the PS domain keys could be most recently generated by a successful UMTS AKA run or a UMTS security context. The PS domain keys most recently generated by the successful UMTS AKA run in the network NT3 (e.g. UTRAN) may or may not have been taken into use by the UE or MSC (Mobile Switching Center). The UMTS security context could be created from an EPS security context during a previous handover of the UE to the network NT3 (e.g. UTRAN) from the network NT4 (e.g. E-UTRAN). There may be old PS domain keys having existed in the UE since the previous visit of the UMTS before the handover. In this situation, the UE does not use the old PS domain keys. Instead, the UE maps the UMTS security context from the EPS security context.

After the security keys are derived, the UE sets the eKSI to an initial value or to the KSI. The initial value may be an arbitrary number between 0 and 7. The KSI may be referred as to the key set identifier $KSI_{PS}$, which is associated with the PS domain keys used in the network NT3. In order to match the security keys which the UE derives from, the network NT4 may use the same security keys for security of data transfer. So the network NT3 may send the PS domain keys to the network NT4, the network NT4 derives the security keys from the PS domain keys used in the network NT3. To be more specific, a MSC or a SGSN of the network NT3 (e.g. UTRAN/GREAN/CDMA2000) send the PS domain keys (e.g. $CK_{PS}$ and $IK_{PS}$) used in the network NT3. Then, a MME of the LTE system derives the security keys from the PS domain keys (e.g. $CK_{PS}$ and $IK_{PS}$). In addition, the network NT3 may send the KSI to the network NT4. Accordingly, the network NT3 may set the eKSI to the initial value or to the KSI. As mentioned above, the initial value may be an arbitrary number between 0 and 7 and the KSI may be referred as to the key set identifier $KSI_{PS}$, which is associated with the PS domain keys used in the network NT3.

On the other hand, the network NT3 may derive the security keys from the PS domain keys (e.g. $CK_{PS}$ and $IK_{PS}$) and then send the security keys to the network NT4. Briefly, the network NT4 may derive the security keys itself or get them from the network NT3.

Please note that the abovementioned steps including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20 in which the processor 200 processes the program code 214 related to the abovementioned processes and the processed results can perform feedback load reduction in the wireless communications system 20.

To sum up, during the SRVCC handover, the UE having an active CS service or a RRC connection in a CS domain receives the handover command to handover from UTRAN/GREAN/CDMA2000 to E-UTRAN. The UE derives the security keys used in E-UTRAN from the CS domain keys (e.g. $CK_{CS}$ and $IK_{CS}$) used in UTRAN/GREAN/CDMA2000. The UE applies the security keys for transmission and reception in E-UTRAN. If the UE has an active CS service or an RRC connection in the CS domain as well as an active PS service or an RRC connection in the PS domain, the UE derive the security keys used in E-UTRAN from the PS domain keys (e.g. $CK_{PS}$ and $IK_{PS}$) used in UTRAN/GREAN/CDMA2000 when receiving the handover command. Consequently, the UE is able to handle security in the SRVCC handover from UTRAN/GREAN/CDMA2000 to E-UTRAN.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling security in a Single Radio Voice Call Continuity (SRVCC) handover for a mobile device having a plurality of Circuit-Switched (CS) domain keys and a plurality of Packet-Switched (PS) domain keys in a wireless communication system, the method comprising:

having an active CS service or a Radio Resource Control (RRC) connection in a CS domain and an active PS connection in a PS domain when the mobile device is served by a first network, wherein the first network supports the CS domain and the PS domain;

receiving a handover command to handover from the first network to a second network, wherein the second network supports the PS domain;

deriving a plurality of security keys used in the second network from the plurality of CS domain keys used in the first network;

applying the plurality of security keys for transmission and reception in the second network; and setting an evolved Key Set Identifier (eKSI) to an initial value, which is an arbitrary number between 0 and 7 and is not associated with the first network, or to a Key Set Identifier (KSI) associated with the plurality of CS domain keys used in the first network;

wherein the first network sends the KSI to the second network, the KSI is associated with the plurality of CS domain keys used in the first network, the second network sets an eKSI to the KSI, and the first network is a mobile switching center.

2. The method of claim 1 further comprising the second network deriving the plurality of security keys from the plurality of CS domain keys used in the first network, wherein the plurality of CS domain key is sent from the first network to the second network.

3. The method of claim 1 further comprising the first network deriving the plurality of security keys from the plurality of CS domain keys used in the first network and sending the plurality of security keys to the second network.

4. The method of claim 1 further comprising the second network setting an evolved Key Set Identifier (eKSI) to an initial value.

5. The method of claim 1, wherein the plurality of CS domain keys are the keys most recently generated by the first network or are the keys currently used by the mobile device and the first network.

6. A method of handling security in a Single Radio Voice Call Continuity (SRVCC) handover for a first network and a second network in a wireless communication system, the method comprising:

having an active Circuit-Switched (CS) service or a Radio Resource Control (RRC) connection in a CS domain and an active Packet-Switched (PS) connection in a PS domain when the first network serves a mobile device having a plurality of CS domain keys and a plurality of PS domain keys, wherein the first network supports the CS domain and the PS domain;

transmitting a handover command to the mobile device, to handover the mobile device from the first network to the second network, wherein the second network supports the PS domain;

deriving a plurality of security keys used in the second network from the plurality of CS domain keys used in the first network;

applying the plurality of security keys for transmission and reception in the second network;

setting an evolved Key Set Identifier (eKSI) to an initial value, which is an arbitrary number between 0 and 7 and is not associated with the first network, or to a Key Set Identifier (KSI) associated with the plurality of CS domain keys used in the first network;

the first network sending the KSI to the second network, wherein the KSI is associated with the plurality of CS domain keys used in the first network; and the second network setting an eKSI to the KSI;

wherein the first network is a mobile switching center.

7. The method of claim 6 further comprising the second network deriving the plurality of security keys from the plurality of CS domain keys used in the first network, wherein the plurality of CS domain key is sent from the first network to the second network.

8. The method of claim 6 further comprising the first network deriving the plurality of security keys from the plurality of CS domain keys used in the first network and sending the plurality of security keys to the second network.

9. The method of claim 6 further comprising the second network setting an evolved Key Set Identifier (eKSI) to an initial value.

10. The method of claim 6, wherein the plurality of CS domain keys are the keys most recently generated by the first network or are the keys currently used by the mobile device and the first network.

* * * * *